Jan. 20, 1959  J. D. McMICHAEL  2,869,679
CLEANER SILENCER ASSEMBLY
Filed Oct. 29, 1956
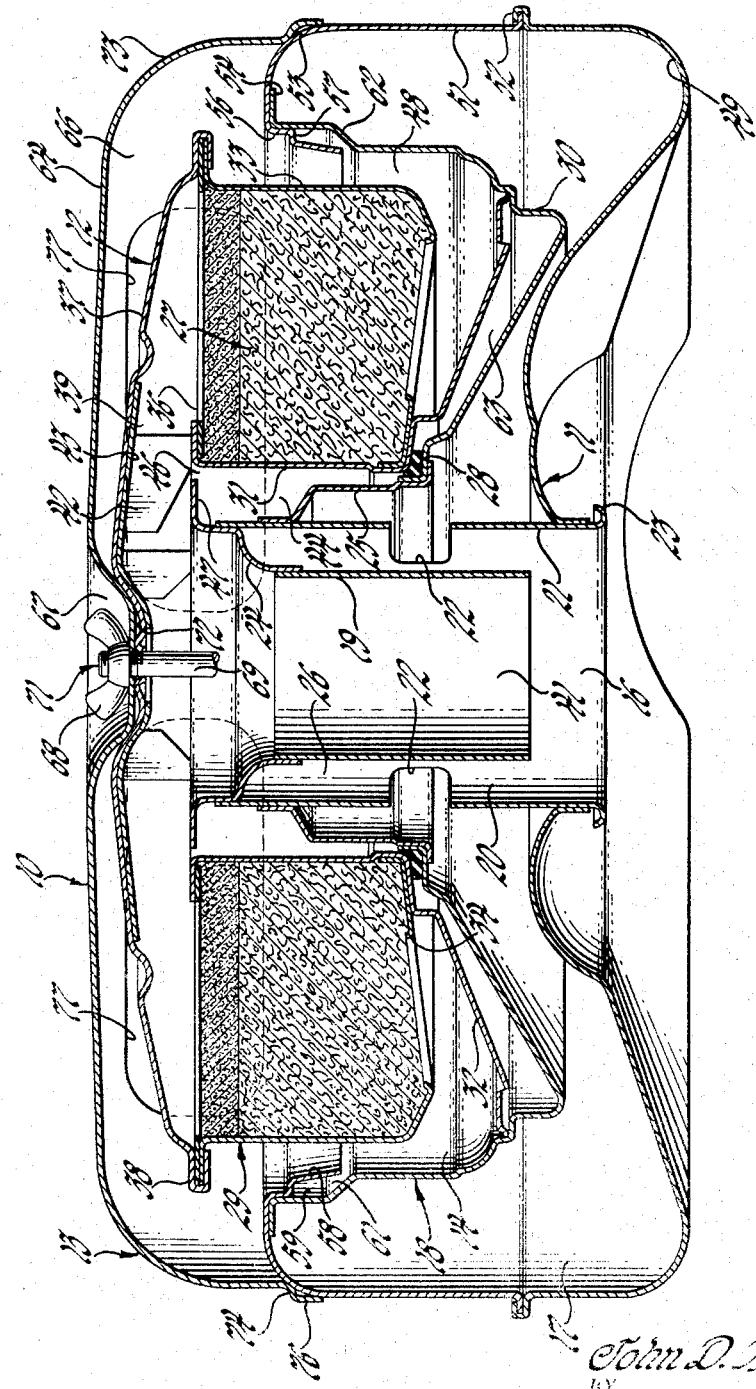
INVENTOR.
John D. McMichael
BY
L. D. Burch
ATTORNEY.

# United States Patent Office

2,869,679
Patented Jan. 20, 1959

2,869,679

CLEANER SILENCER ASSEMBLY

John D. McMichael, Swartz Creek, Mich., assignor to General Motors Corporation, Detroit, Mich., a corporation of Delaware Application October 29, 1956, Serial No. 618,841

1 Claim. (Cl. 183—15)

This invention relates to cleaner silencer assemblies especially applicable for use with V-type engines for automotive and other purposes.

It is proposed to construct a cleaner silencer assembly embodying both resonating chamber and low-pass filter sound attenuating means in series and in combination with an oil bath or other suitable filter means, the principal purpose of this combination being to provide an efficient structure that can be manufactured at low cost, that may be constructed from relatively standard parts, that may be easily assembled and disassembled, that will require a minimum of height for the installation thereof, and that may utilize parts that are easily manufactured by a minimum of efficient and high production machine units.

In the drawings, the single figure illustrating the invention is a vertical sectional view of a cleaner silencer assembly embodying the invention.

The cleaner silencer assembly 10 embodies a supporting wall unit 11, a filter unit 12 and a cover unit 13. The supporting wall unit 11 includes walls forming an annular filter chamber 14, an outlet 16 and a resonating chamber 17. The filter chamber 14 is formed by an annular depression extending into the wall 18 of the unit 11 which projects inwardly of the resonating chamber 17. The filter chamber 14 opens outwardly in one direction from the annular depression. Outlet 16 opens outwardly in the opposite direction through a passage 41 extending through the resonating chamber 17 and formed by concentrically disposed conduit walls indicated at 19 and 21 and joined at the top by a ring wall 24. The resonating chamber 17 communicates with the outlet 16 through an acoustical coupling formed by the annular space 20 between the walls 19, 21 and 24 and by openings 22 formed in the wall 21. The wall 21 has a bead 23 formed at the lower extremity thereof and around the outlet 16 for engagement with the inlet leading to the induction system of an internal combustion engine with which the assembly may be employed.

Low frequency sounds emanating from the engine may be attenuated by the relatively large resonating chamber 17 and the acoustical coupling provided by the openings 22 and the space 20 leading to the outlet 16. High frequency sounds also may be attenuated in the expansion chamber 26 formed between the walls 19, 21 and 24 and beyond the openings 22.

Annular filter means 27 may be disposed within the filter chamber 14 on gasket means 28 engaging the lower inner corner of the filter casing 29. The filter casing 29 may be constructed in any suitable manner but in the present instance it is constructed by employing an inner wall 31 having an outwardly flanged extension forming the oil control bath 32 for the filter unit 27. The outer and lower parts of the casing are formed by a wall 33, the lower part of which is provided with openings 34 providing for the admission of air to the lower part of the filter unit 27. The casing 29 also may embody a perforated upper wall 36 through which air cleaned by the filter unit is discharged. The filter unit has a cover 37, the outer edge of which is formed to provide a bead 38 within which the edges of the walls 33 and 36 are secured. The cover 37 is curved away from the outlet formed by the wall 36 to provide an outlet chamber 39 communicating with the outlet 16 through an outlet passage 41 extending through the walls 19 and 24. The central part of the cover 37 may be supported from the upper end of the inner wall 31 by spacing means 42 struck out from a plate 43 secured to the inner surface of the cover 37. It is proposed to construct the filter unit 27 so that when assembled in the filter chamber 14 the inner and outer and lower walls of the casing 29 will be spaced from the wall 18 except where the gasket 28 supports the filter unit 27. The annular space inwardly of the inner wall 31 and above a section 25 of the wall 18 may provide a small resonating chamber 44 connected to the outlet chamber 39 by an annular acoustical coupling 46 which is formed between the upper end of the wall 31 and a flange 47 extending outwardly from the upper part of the ring 24. The chamber 44 may be employed to attenuate high frequency sounds emanating from the engine. The annular space between the lower and outer walls of the filter casing 29 and section 30 of the wall 18 provides an annular inlet 48 leading to the lower part of the filter unit 27. In order to provide an efficient and economical construction for the outer wall forming the inlet 48 it is proposed to construct the wall 11 in sections 49 and 51 secured together by a bead 52. The section 51 is formed to extend inwardly at the top and to provide an arcuate shoulder 53 beyond which the wall section is adapted to overlap an outwardly projecting flange 54 formed around the upper edge of the wall 18. Beyond the flange 54 the wall section 51 is formed at 56 to extend inwardly of the inlet 48 along the inner surface of the wall 18 and then laterally of the inlet 48 at 57. Beyond the lateral part 57, the wall section 53 has an extension 58 which is spaced from the wall 18 to provide an annular oil trap 59, the lower extremity of which is adapted to communicate with the inlet 48 through a restricted inlet and outlet indicated at 61. The restricted inlet and outlet 61 is formed by a downwardly and inwardly sloping part 62 of the wall 18, the inner extremity of which bends again adjacent the edge of the extension 58. Beyond the bend the wall 18 continues substantially in alignment with the extension 58 and in a manner to form substantially a streamlined passage within the walls forming the inlet 48. The axial dimension of the inlet and outlet 61 is small relative to the proportions of the annular chamber 59, in order to affect the air flow within the annular inlet 48 as little as possible.

It will be apparent that air will flow inwardly through the inlet 48 and beyond the trap 59 and the inlet and outlet 61, will be relatively linear and at high velocity and without appreciable turbulence. Due to such linear flow and lack of turbulence it will also be apparent that little air will be circulated in the trap 59, which will promote the retention in the trap of any oil that may be collected in the trap as a result of splashing in the oil sump 63 or of movement of oil upwardly of the wall 18 by interfacial tension between the oil and the surface of the wall. It will be noted that this is an economical construction from the standpoint of manufacturing and assembly of parts. The parts may be properly formed by simple manufacturing processes. To assemble the parts it is only necessary to place the wall section 51 on the wall 18 with the guide section 56 extending inwardly of the wall 18 until the flange 54 is engaged. Thereafter, the parts may be secured together by spot welding through the flange 54. When the wall section 51 is in place the section 51 may be secured to the section 49 by forming the bead 52. Due to the relation between the large volume of the trap 59, the narrow width of the inlet and outlet 61 and the effect of gravity, the oil collected in the trap will not tend to move by interfacial tension around the end of the extension 57 and to spread outwardly of the inlet 48 upon the outer surface of the wall section 51. When the engine is not running the oil collected in the trap will tend to return by gravity to the sump 63 along the inner surface of the wall 18.

An inlet cover 64 is provided for the assembly for the purpose of closing the upper part of the assembly to form an inlet chamber 66. It is proposed to construct the cover 64 so that it will not appreciably increase the height of the assembly, so that it will provide substantially uniform distribution of air to all parts of the inlet 48, so that it will provide an expansion chamber with considerable capacitance for attenuating sounds emanating from the inlet 48 and so that it will direct any sound that may not be attenuated by the assembly in one direction and away from the occupants of the vehicle with which the structure may be employed. It is proposed to accomplish these and other results with a simple one-piece cover that may be formed and assembled by a minimum of operations. The cover 64 is formed to provide a depression 67 at the central part thereof which is adapted to receive a wing nut 68 engaging the threaded end of a bolt 69. The bolt and wing nut are adapted to provide fastening means 71 for securing the depressed part of the cover in a depression 72 formed in the central part of the cover 37 and for securing the filter unit 27 in the inlet chamber 14. In forming the outlet chamber 39 within the cover 37 it is expedient to slope the cover 37 toward the central part of the cover 37 and away from the outlet 16. However, it is not necessary to similarly slope the cover 64. The cover 64 outwardly of the depression 67 therein may be relatively flat, thereby providing a part of the inlet chamber 66 above the cover 37. Beyond the outer peripheral edge of the cover 37 it is proposed to curve the cover 64 laterally as is indicated at 73. The curved part 73 of the cover 64 when formed in this manner will provide a considerable amount of space beyond the outer peripheral edge of the cover 37 and in open communication with the inlet 48. In order to support the cover 64 it is proposed to provide an annular shoulder 74 adjacent the edge thereof and a flange 76. The annular shoulder 74 is adapted to engage the shoulder 74 on the wall section 51 and the flange 76 is adapted to telescope the outer surface of the wall section 51.

Openings 77 are formed in one side of the cover 64 for admitting air to the inlet chamber 66. It will be noted that the openings 77 extend downwardly substantially to the plane of the upper surface of the wall section 51 so that air admitted to the inlet chamber 66 on one side of the structure will flow directly into the inlet 48. However, the openings 77 also extend inwardly above the bead 38 forming the outer peripheral edge of the cover 37 to a somewhat greater extent than they extend downwardly below the bead. It will therefore be apparent that the upper parts of the openings 77 will cause air to be directed between the covers 37 and 64 and across the assembly to the part of the inlet chamber 66 which is directly opposite the openings 77. This will tend to supply substantially an equal amount of air to the part of the inlet 48 which is directly opposite the openings 77. It will also be apparent that some of the air received from the openings 77 will tend to flow around the inlet chamber 66 within the curved part 73 of the cover 64. This will tend to supply equal quantities of air to the parts of the inlet 48 that are on opposite sides of the assembly from the openings 77. It has been found in practice that this simple construction does materially decrease the sound emanating from the inlet 48 and does distribute substantially equal quantities of air to all parts of the inlet 48, without substantially restricting the flow of air to the inlet 48 and without materially increasing the height of the structure.

I claim:

A cleaner silencer assembly comprising wall means formed to provide an annular filter chamber opening outwardly in one direction, said wall means including an outer side wall and an inner side wall and a lower wall embracing said annular filter chamber, annular filter means disposed in said filter chamber and spaced from said outer side wall and said lower wall to provide an annular inlet leading to said filter means, an oil sump at the lower extremity of said filter chamber and beneath said filter means, and an annular trap formed in said outer side wall and communicating with said annular inlet throughout the extent of said annular inlet, said annular trap being formed within said outer side wall to provide an annular chamber and inlet and outlet opening means at one side and at the lower extremity of said annular chamber and communicating with said annular inlet, said outer side wall being formed to provide interrupted side wall means having axially spaced edges forming said inlet and said outlet opening means and overlapping side wall means forming said annular chamber, said interrupted side wall means being substantially aligned and having the same curvatures and providing a relatively linear air flow passage at one side of said trap and leading to said filter means, the axial spacing between said edges of said interrupted side wall means forming said inlet and outlet opening means being less than the width and axial length of said annular chamber, thereby tending to provide a fluid flow restriction between said annular inlet and said annular trap.

References Cited in the file of this patent

UNITED STATES PATENTS

| 2,557,237 | Sebok | June 19, 1951 |
| 2,586,935 | Gerson | Feb. 26, 1952 |
| 2,690,233 | Dreznes | Sept. 28, 1954 |

FOREIGN PATENTS

| 922,975 | France | Feb. 10, 1947 |
| 142,127 | Australia | July 10, 1951 |